United States Patent [19]

Miller

[11] 4,223,586

[45] Sep. 23, 1980

[54] ANCHOR FOR SHEET METAL SCREWS AND THE LIKE

[76] Inventor: Michael J. Miller, 3532 W. Colter Ave., Phoenix, Ariz. 85019

[21] Appl. No.: 832,561

[22] Filed: Sep. 12, 1977

Related U.S. Application Data

[63] Continuation-in-part of Ser. No. 737,330, Nov. 1, 1976, abandoned.

[51] Int. Cl.$^2$ .......................... H01R 7/08; F16B 13/04

[52] U.S. Cl. ........................................ 85/63; 85/50 R; 85/85; 339/263 R

[58] Field of Search ................ 151/4, 7, 8, 14 R, 14.5, 151/14 DW, 23, 41.74, 46, 60; 85/23, 24, 63, 80, 82, 83, 85, 50 R; 339/263 R

[56] References Cited

U.S. PATENT DOCUMENTS

| | | | |
|---|---|---|---|
| 394,537 | 12/1888 | Griffin | 151/4 |
| 1,295,590 | 2/1919 | Pleister | 85/63 |
| 1,364,298 | 1/1921 | Nies | 151/8 X |
| 1,801,505 | 4/1931 | Hurst | 151/8 |
| 1,881,836 | 10/1932 | Mitchell | 85/80 |
| 2,259,720 | 10/1941 | Amesbury | 85/80 |
| 2,561,679 | 7/1951 | Waller | 151/14.5 |
| 2,588,860 | 3/1952 | Marks | 151/23 X |
| 2,990,866 | 7/1961 | Macy et al. | 151/14.5 |
| 3,144,803 | 8/1964 | Briles | 339/263 R X |
| 3,189,075 | 6/1965 | Jobe | 151/8 |
| 3,221,790 | 12/1965 | Poupitch | 151/7 |
| 3,921,280 | 11/1975 | King, Jr. | 151/14 R X |
| 3,962,744 | 6/1976 | Bien et al. | 151/7 X |

FOREIGN PATENT DOCUMENTS

| | | | |
|---|---|---|---|
| 295595 | 3/1954 | Switzerland | 85/83 |

*Primary Examiner*—William E. Lyddane
*Attorney, Agent, or Firm*—Christie, Parker & Hale

[57] ABSTRACT

An anchor, suitable for use with sheet metal screws and the like, has particular utility in the making of repairs where an article is to be secured by a sheet metal screw in an oversized blind hole formed in a second article. The anchor includes a washer-like head having an opening for passage through the head of the shank of the screw. An elongate laterally deflectable and deformable finger is connected at one end thereof to the head effectively along a portion of a boundary of the opening. The other end of the finger is spaced from the head. The finger is so positioned relative to the opening that the finger, upon insertion thereof into a hole in an article to which a connection is to be made and upon insertion of the pointed shank of the screw into the hole through the opening, interferes with the screw threads to provide a bite for the threads. Also, the interference of the threads with the finger causes the finger to tend to deflect away from the threads and to deform between the threads and the hole sufficiently to jam in the hole to secure the finger from turning in the hole as torque is applied to the screw.

15 Claims, 17 Drawing Figures

Fig. 1
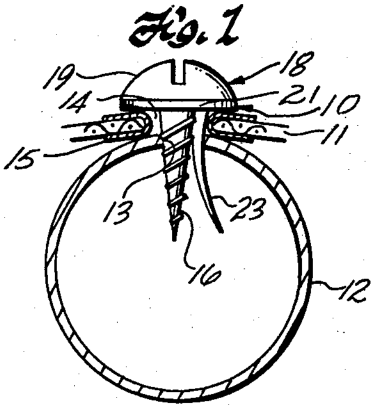
Fig. 4
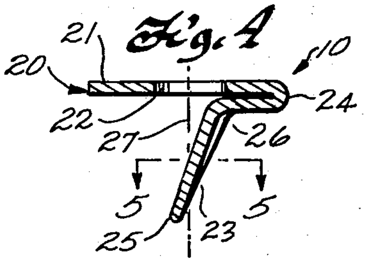
Fig. 5
Fig. 2
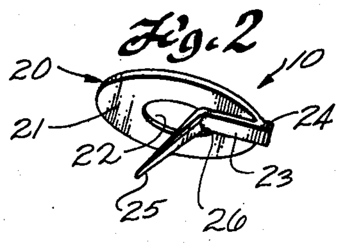
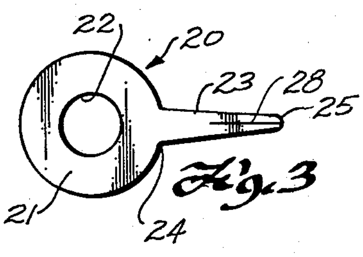
Fig. 3
Fig. 6
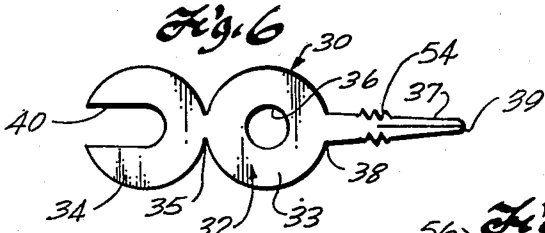
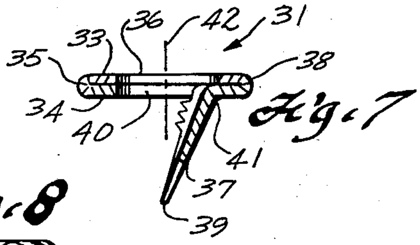
Fig. 7
Fig. 8
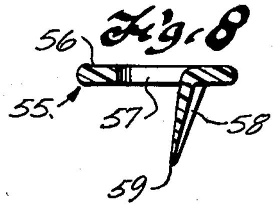
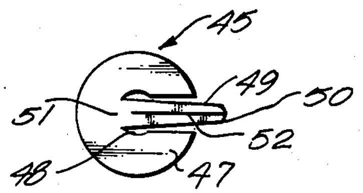
Fig. 9
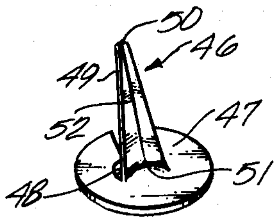
Fig. 10
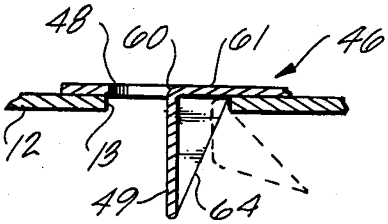
Fig. 11

Fig. 13
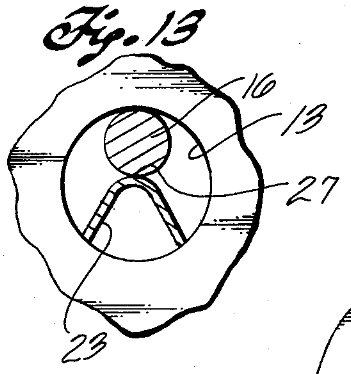
Fig. 14
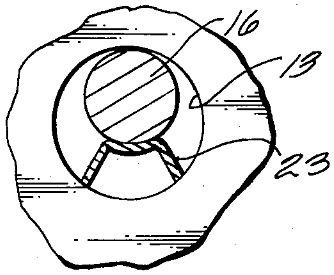
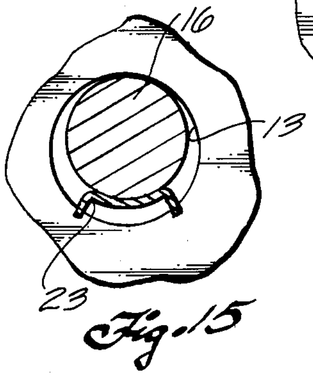
Fig. 15
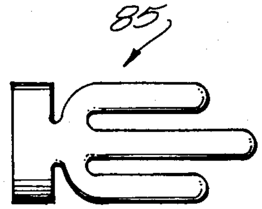
Fig. 16
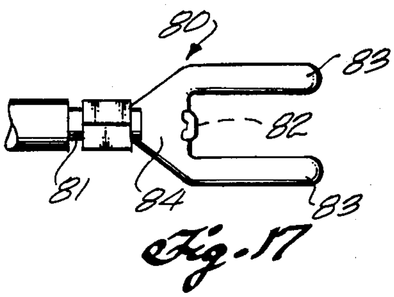
Fig. 17
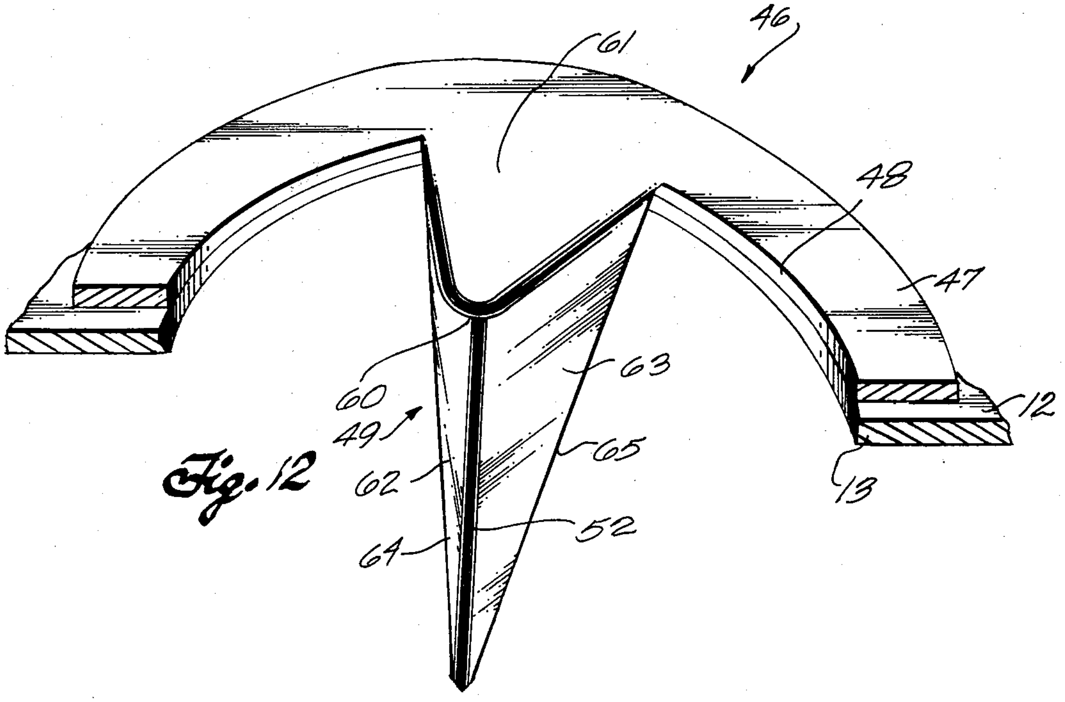
Fig. 12

ANCHOR FOR SHEET METAL SCREWS AND THE LIKE

CROSS-REFERENCE TO RELATED APPLICATIONS

This application is a continuation-in-part of my prior application Ser. No. 737,330 filed Nov. 1, 1976, abandoned on the filing of this application.

FIELD OF THE INVENTION

This invention relates to fastener anchors. More particularly, it pertains to an anchor for use with sheet metal screws. The anchor has particular utility in making repairs in situations where an original hole has been stripped or is otherwise found to be oversized relative to the screw fastener.

BACKGROUND OF THE INVENTION

Review of the Prior Art

Many load-bearing articles are supported on frames made of tubular metal; the fabric seats of wheelchairs and of lawn and beach furniture are common examples. It often occurs that the load-bearing article, i.e., the wheelchair seat, wears out and requires replacement. Typically, wheelchair seats are made principally of fabric and are mounted to the tubular metal wheelchair frames by sheet metal screws which are passed through grommets formed around suitable holes in the margins of the chair seat. Repairs to wheelchairs, either by the user of the wheelchair or by others, is often frustrated and made very difficult, if not impossible, where the screw holes in the chair frame are stripped. In fact, stripping of the holes may be the principal cause for the repair in that the seat itself may be sound, but the connection of the seat to the chair frame may not be sound due to one or more of several causative factors including the load applied to the chair seat, and the fact that the tubular metal chair frame is relatively thin walled. The result of these causative factors is that the screws used to secure wheelchair seats frequently strip out of the holes provided for them in the chair frame.

Where the screw-receiving hole in a wheelchair frame is stripped or is otherwise oversized relative to the screw, commercially available screw anchors may not conveniently be used. If commercially available anchors are to be used, the screw hole must be further enlarged simply to permit the anchor to be inserted into the hole. Enlargement of the screw holes in wheelchair frames is undesirable because such practice leads to weakening of the chair frame and also requires the use of special equipment, such as a power drill, which is usually not accessible to the person desiring to make the repair at the time the repair needs to be made. Further, commercially available screw anchors are relatively long and cannot be used in modern wheelchair frames. The substitution of a nut and bolt in place of a sheet metal screw is impractical unless a hole is drilled entirely through the tubular frame, and this is not desirable for the reasons noted above.

The problem to which this invention is addressed was initially discerned in the context of my desire to make repairs to a wheelchair. It will be apparent, however, that the anchor of the present invention is useful in a variety of situations and is not restricted in use only to the making of repairs to wheelchairs.

In the preparation of this patent application, the following U.S. patents were specifically considered, U.S. Pat. Nos.:

394,537
1,295,589
1,295,590
1,340,778
1,364,298
1,801,505
1,881,836
2,258,860
2,259,720
2,561,679
2,588,860
2,990,866
3,148,579
3,189,075
3,221,790
3,921,280
3,962,744

Swiss Pat. No. 295,595 was also considered.

The several devices shown in Swiss Pat. No. 295,595 are intended for use as anchors in holes formed in stone or masonry, and cannot realistically be used to serve the purposes addressed by the present anchors. The assemblies shown in U.S. Pat. No. 2,259,720 are designed for incorporation into new products which must be shaped accordingly; these arrangements cannot be used to make repairs in existing products which were not originally made with the necessary features. The rail tie anchor shown in U.S. Pat. Nos. 1,295,589 and 1,295,590 require two-handed operation as they must be held secure from rotation relative to the bolts with which they are used as the bolts are installed. The washer component of the lock nut assembly illustrated in U.S. Pat. No. 394,537 is used, in effect, as a key between a specially configured bolt and a form of castle nut and, thus, has only superficial similarity to certain forms of the present anchor.

A device addressed to the problems described above should be inexpensive, simple, easy to use, require only standard tools to use, and be capable of use by a single person using one hand to drive the fastener, thereby leaving the other hand free to hold one of the two things being connected together.

SUMMARY OF THE INVENTION

This invention is addressed to and solves the problems described above. It provides an improved anchor for use with threaded fasteners, such as sheet metal screws, in conjunction with receiving holes which are oversize relative to the fastener. The present fastener anchor is structurally simple, is easily manufactured in a variety of forms, and is marketable at retail at reasonable cost. The present anchor is easy to use, and can be particularly useful in blind holes such as holes formed in tubular articles. The anchor does not require the use of special tools and need not itself be held or engaged by a tool as the fastener is installed. The present anchor satisfies the aforementioned need which is not satisfied by screw fastener anchors presently available.

In general, this invention provides an anchor for use with screws in conjunction with oversize receiving holes. The anchor comprises a washer-like head having an opening for passage through the head of the shank of a screw. An elongate deformable finger is connected at one of its ends to the anchor head effectively along a portion of the boundary of the opening. The other end of the finger is spaced from the head. The finger is disposed relative to the axis of the opening in such a manner that, upon insertion of the finger into a hole in an article to which a connection is to be made, and upon insertion of the shank of the screw into the hole through the opening in the anchor head, the finger interferes with the screw threads to provide a bite for the threads and is also deformed between the threads and the hole to jam, deform and bend in the hole sufficiently to secure the anchor from rotation in the hole and neither turn with the screw as torque is applied to the screw nor thereafter be readily removable from the hole.

DESCRIPTION OF THE DRAWINGS

The above-mentioned and other features of this invention are more fully set forth in the following detailed description of presently preferred embodiments of this invention, which description is presented with reference to the accompanying drawings, wherein:

FIG. 1 is a cross-sectional elevation view of a preferred use of a fastener according to this invention;

FIG. 2 is a perspective view of the anchor;

FIG. 3 is a plan view of an anchor blank in an initial stage of manufacture of the anchor shown in FIG. 2;

FIG. 4 is a cross-sectional elevation view of the anchor shown in FIG. 2;

FIG. 5 is a cross-section view taken along line 5—5 in FIG. 4;

FIG. 6 is a plan view of the blank for another anchor of this invention in an initial stage of manufacture thereof;

FIG. 7 is a cross-sectional elevation view of the anchor fabricated from the blank shown in FIG. 7;

FIG. 8 is a cross-sectional elevation view of another anchor;

FIG. 9 is a plan view of the blank for yet another anchor according to this invention;

FIG. 10 is a perspective view of an anchor fabricated from the blank shown in FIG. 9;

FIG. 11 is an enlarged cross-section view of the anchor of FIG. 10 in use;

FIG. 12 is a greatly enlarged perspective view of the finger portion of an anchor made from the blank shown in FIG. 9;

FIGS. 13, 14 and 15 are enlarged fragmentary sequential section views showing how the finger of the anchor shown in FIG. 10, for example, is deformed in use;

FIG. 16 is a plan view of an electrical connection lug incorporating features of this invention; and FIG. 17 is a plan view of a lug made from the blank of FIG. 16 connected to an electrical conductor.

DESCRIPTION OF THE ILLUSTRATED EXEMPLARY EMBODIMENTS

With reference to FIGS. 1–5, an anchor 10 for sheet metal screws may be used to secure a fabric article 11, such as a wheelchair seat, to a tubular metal support 12, such as a wheelchair frame, via a hole 13 formed through the tube into the interior thereof. Typically, fabric article 11 has a hole 14 therethrough which is lined and reinforced by a metal grommet 15. The threaded shank 16 of a self-tapping sheet metal screw 18 having a head 19 is used to secure the article to the tube with the cooperation and assistance of anchor 10.

FIG. 1 illustrates a situation in which the anchors according to this invention have particular utility. That situation is that hole 13 is oversized relative to the threaded shank of screw 18. Hole 13 may have become oversized through use either as a result of repeated prior repairs, or by cross-threading of the screw in the hole in a prior connection of the article to the tube, or by virtue of the screw having pulled from and stripped the hole in response to a load applied to article 11. In any event, the oversize nature of hole 13 relative to screw 18 makes it impossible to successfully use merely that fastener or one of identical size to resecure the fabric to the tube. In a typical case, it is not possible to use a larger sheet metal screw to make the needed repair because the opening in grommet 15 limits the size of the screw which may be used. Thus, the problem is how to make the needed repair using the screw originally provided even though the hole 13 is now oversized. This problem is solved by the use of an anchor according to this invention, such as anchor 10.

As shown in FIGS. 2, 3 and 4, anchor 10 preferably is fabricated from a sheet metal blank 20 shown in plan view in FIG. 3. The blank has a circular head portion 21 through which a central circular hole 22 is formed, as by stamping. A finger portion 23 extends laterally from the outer perimeter of the annular head portion. The finger has an inner end 24 which is secured, preferably integrally, to the head and an opposite unsupported end 25.

As shown best in FIG. 4, anchor 10 is fabricated from blank 20 by bending the finger at its inner end 24 back across one face of the generally planar, washer-like head 21 and then by bending the finger as at 26 at a location intermediate its ends 24 and 25 at about the adjacent edge of aperture 21 so that the finger extends away from the head toward the axis 27 of the aperture. While the actual connection of the finger 23 to head 21 is at 24, the finger is effectively connected to the head along a portion of the boundary of hole 22 for cooperation with screw 18 essentially immediately upon insertion of the screw shank 16 into the hole as more fully set forth below. The finger has a length from adjacent the head aperture (i.e., from bend location 26) to its unsupported end 25 which is at least equal to the diameter of aperture 22, thereby to assure that the finger will make adequate contact with the shank of screw 18 and will be bent or deflected from its normal position back toward and over the edge of hole 13 to jam the anchor in hole 13. As illustrated in FIG. 5 which is a true cross-section taken along line 5—5 in FIG. 4, the finger between bend 26 and its unsupported end 25 preferably is transversely bent to be convex to the anchor aperture axis. Thus, in FIG. 3 which shows blank 20 in its as-stamped state prior to bending at 24 and 26 to define the finished anchor, finger 23 has a longitudinal crease 28 which begins at the location 26 where the intermediate bend in the finger will be made and which extends from such location to the unsupported end 25 of the finger. In its creased portion, the finger has a V-shaped transverse cross-section, which cross-section is effective during use of the anchor, as shown in FIGS. 13, 14 and 15, to cause the finger to interfere sufficiently with the shank of screw 18 to be deformed by the screw and to bite into the margins of hole 13 to be securely held with the screw in the hole.

Aperture 22 has a diameter which is selected to cooperate with the outer diameter of the threaded shank of a selected size and type of threaded fastener such as a particular size of self-tapping sheet metal screw 18. The diameter of aperture 22 is sized relative to the geometry of the fastener so that the threaded shank of the fastener may be passed through the aperture along axis 27 without interference with the head portion of the anchor, and so that the head 19 of the fastener may mate snugly with the face of the anchor head opposite from finger 23. This situation is shown in FIG. 1. It will be appreciated, however, especially in view of the illustrations of FIGS. 9 and 17, that the opening in head 21 of anchor 10 need not be circular and need not be bounded on all sides by the head. Once the finger of the anchor is disposed in the hole into which the screw is to be engaged, the finger positions the anchor relative to the hole; the opening in the anchor head, therefore, need not be fully founded by the head, as in a typical washer, to maintain the head in position relative to the screw shank.

It is desirable that finger 23, from a location therealong adjacent the edge of the aperture, extend away from the head and toward the axis 27 of the head aperture so that the finger mechanically contacts the end of the fastener shank when the fastener is only partially inserted through the aperture. It is important that finger 23 be deflectable laterally of its length out of its normal position in the anchor without separating from the anchor head; the sheet metal from which the anchor is made inherently provides the requisite resilience and deformability of the finger. It is also desirable that the effective length of the finger, from the anchor head to the unsupported end of the finger, be at least equal to the diameter of the head aperture. Also, it is important that the finger, in addition to being deflectable by the screw, also be deformable by the screw between the screw and the boundaries of hole 13; this deformability is provided where the anchor is made of sheet metal, or is molded of plastic as shown in FIG. 8.

Because hole 13 in metal tube 12 is oversized relative to the diameter of sheet metal screw shank 16, the screw alone would be ineffective, because of insufficient bite of the screw threads in the material of the tube circumferentially of the hole 13, to secure fabric article 11 to tube 12. Anchor 10 is used to remedy this difficulty and to enable screw 18 to be used to secure article 11 to tube 12. Thus, grommeted hole 14 of the fabric article is registered with hole 13 in tube 12 and the finger of anchor 10 is inserted into the registered holes. The shank 16 of sheet metal screw 18 is then passed through the aperture 22 in the anchor head and into hole 13. However, the screw can be only partially inserted through the anchor and into hole 13 before it engages anchor finger 23, as shown in FIG. 13. At this point a suitable driving tool, such as a screwdriver, is engaged with the head of the screw and the screw is both turned in a threading direction and pushed toward the interior of tube 12. As the screw is so urged through hole 13, the external threads on the shank of the sheet metal screw increasingly deflect the free end 25 of anchor finger 23 out of the way and deform the preferably pyramidally configured base end of the finger, and the threads of the sheet metal screw increasingly bite into the adjacent surfaces of the anchor finger. Also, the transversely bent configuration of the finger (see FIG. 5) is deformed between the hole 13 and shank 16 in such manner that the edges of the finger bite into the edge of the hole; see FIGS. 14 and 15. In this way, the finger and the anchor of which it is a part are restrained from turning with the screw; this action is more fully described below with reference to FIGS. 9–12. The resistance of the finger to the deformation illustrated in FIGS. 14 and 15 is reflected against the screw shank 16, thus causing the screw threads to further bite into the finger and to further jam the finger in hole 13. Opposite from the finger, the screw threads bite into and rethread themselves into the metal of tube 12 at hole 13. In this way, screw 18 is securely screwed tight into the tube thereby to secure the fabric article 11 to the tube.

In view of the preceding description and especially the content of FIGS. 13, 14 and 15, it will be understood that the configuration of finger 23 between intermediate bend 26 and the finger end 25 could be concave toward, rather than away from, the shank 16 of screw 18 as the screw is engaged with the finger; see FIG. 7. In such a case, the crease 29 of the V-shaped configuration of the finger would engage the boundary of hole 13 and tend to bite into the hole margin as the finger is deflected and deformed by the screw in the manner described. A transverse V-shaped cross-sectional configuration of the finger concave away from the screw is preferred, however, and is therefore the configuration which is shown in the accompanying illustrations except as to anchor 31.

As shown in FIG. 11 with reference to anchor 45, the finger 23 of anchor 10 ultimately is deflected sufficiently away from the screw shank that the finger is bent back over the adjacent margin of hole 13. Thus, if the screw should later tend to loosen between the hole and the anchor finger, the deflected finger serves to hold the anchor in the hole and the screw with it.

FIG. 6 is a plan view of a sheet metal blank 30 for another anchor 31 shown in FIG. 7. Blank 30 has a head portion 32 of generally "figure 8" configuration having two generally circular lobes 33 and 34 which are intergrally interconnected at 35. One lobe 33 of head 32 has a central circular aperture 36 therethrough of selected diameter. A finger 37 extends laterally from lobe 33 diametrically opposite the connection of lobe 33 to lobe 34. The finger has an end 38 connected to lobe 33 and a free end 39. Several teeth 54 are defined by serrations formed in the edges of the finger adjacent body lobe 33, as shown in FIG. 6. The teeth open toward lobe 33; this is shown for purposes of example, but it is preferred that the finger be bent so that the teeth 54 open away from lobe 33. Lobe 34 has a slot aperture 40 formed in it, the slot having a width transversely of the elongate extent of finger 39 which is equal to the greater of (a) the width of finger 37 at end 38 and (b) the diameter of aperture 36 through lobe 33. Slot 40 extends away from aperture 36 in alignment with finger 37 and opens to the margin of lobe 34 opposite from the finger.

Anchor 31 is fabricated from blank 30 in the manner illustrated in FIG. 7. The blank is bent back on itself at interlobe connection 35 so that the lobes 33 and 34 are placed in overlying instead of end-to-end relation. Aperture 36 is not restricted by the presence of lobe 34 across one face of lobe 33. The slot aperture 40 is aligned with finger 37 which is then bent at its end 38 through an angle of 180 back against that face of lobe 33 with which lobe 34 is then registered; see FIG. 7. Then, in much the same manner as occurs in the fabrication of anchor 10, finger 37 is bent at a location 41 adjacent to but within the edge of aperture 36 through an arc of less than 90° so that the free end 39 of the finger is disposed away from the head of the anchor and is proximate to the axis 42 of aperture 36. Anchors 10 and 31 are functionally similar. In anchor 31, lobes 33 and 34 of the blank, in the final configuration of the anchor, cooperate to define a generally flat washer-like head which is of uniform thickness across substantially the entire circumference of the head. The finger of anchor 31, between its intermediate bend location 41 and free end 39, is shown for the purposes of example, as noted above, to be transversely contoured concave toward aperture axis 42. Preferably, however, the finger is creased concave away from the aperture axis so that teeth 54 grip the edge of hole 13 upon insertion of the anchor into tube 12, for example, to hold the anchor in place until screw 18 can be inserted and to enhance the biting cooperation between the finger and the hole as the finger is deflected and deformed by the screw as the screw is driven.

FIG. 8 shows another anchor 55 which is formed of synthetic plastic material rather than metal, but is otherwise structurally and functionally similar to the other fasteners described. Anchor 55 is made of deformable and relatively resilient plastic such as polyethylene or polypropylene, for example, as opposed to a rigid or brittle plastic. Anchor 55 has a generally flat washer-like annular head 56 having a central aperture 57 formed therethrough. A finger 58 is connected integrally to the head adjacent the edge of aperture 57 and extends away from the head to an unsupported end 59 which is disposed proximate to the axis of the aperture. Finger 58 is concave away from the axis of aperture 57.

FIG. 9 shows another sheet metal blank 45 which may be used to advantage to define another anchor 46. Anchor 46, shown in FIG. 10, is the form of this invention which is presently preferred. Blank 45 has a head portion 47 which is generally in the form of a block letter "C" and has a circular central opening 48. Blank 45 has a finger portion 49 which extends across aperture 48 and through and beyond the gap of the head to a free end 50. Finger 49 has a base end 51 where the finger is integrally connected to the anchor head. Preferably the width of the opening between the arms of the C-shaped head is equal to the transverse width of finger 49, although, if desired, the width of the head gap may be greater than the width of the finger, even to the extent of being equal to the diameter of aperture 48. Preferably, finger 49 is longitudinally creased as at 52 partially along its length from its tip to impart a V-shaped transverse configuration to the finger, the "V" becoming deeper proceeding from end 51 to end 50 of the finger, and also to impart a pyramidal configuration to the finger with the apex of the finger being in aperture 48 in the finished anchor as shown in FIGS. 11 and 12. The finished anchor 46 is defined by bending finger 49 so that it has the geometry shown in FIGS. 11 and 12 and so that the free end of the finger is located away from the head and closer to or even across the aperture axis 48 from its base end.

The pyramidal configuration of finger 49 in anchor 46 is shown most clearly in FIGS. 11 and 12. The pyramid has an open triangular base and an apex 60 which is defined by the intersection of the three sides 61, 62 and 63 of the pyramid. Pyramid side 61 is in the plane of the top of head 47 of the anchor so that apex 60 is within aperture 48. Sides 62 and 63 have edges 64 and 65 which converge at the tip of the finger and extend to the boundary of aperture 48.

As shown in FIG. 11, when finger 49 is placed in oversized hole 13 to which a connection is made, it occupies a sufficient portion of the hole that screw shank 16 cannot pass freely into the hole through the anchor aperture 48. The screw can be properly engaged with the hole only by cooperation with the hole rim opposite from the finger and by deformation of the finger. The deformed position of the finger is represented in broken lines in FIG. 11 and is bent back under member 12 away from hole 13 to mechanically hold the anchor in the hole.

The pyramidal configuration of finger 49 assures that the finger will jam, bend and deform in the manner described above and as shown in FIGS. 11, 13, 14 and 15 during use of the anchor. The load applied to apex 60 as screw 18 is driven into hole 13 is transferred by the skin of the pyramid (principally by sides 62 and 63) to the edge of the hole behind the finger. Thus, pyramid edges 64 and 65 adjacent pyramid side 61 bite into the edge of the hole in the manner shown in FIGS. 13, 14 and 15. Also, the edge of the pyramid along the intersection of sides 62 and 63, and also the apex itself, is crushed or deformed by the screw as it advances into the hole; the screw threads bite into these portions of the finger as the finger deforms. The result is that the finger is bent back away from the hole to lock itself into the hole, and the screw is threaded between the finger and the edge of the hole opposite from the finger. In this way a secure threaded connection is made in a hole which initially was oversized relative to the screw.

The anchors described above can be used in many situations. They can be used in blind holes as well as in holes having access from both sides. They can be used in television and radio repairs, and also in repairs to ducting for furnaces and air conditioning systems. Features of these present anchors can also be incorporated into devices having other functions. For example, FIG. 17 shows an electrical connector 80, generally resembling a common spade lug, useful to mechanically and conductively connect an electrical conductor 81 to some other member via a screw and a hole in the member. Connector 80 is especially useful where the connection is to be made in a vibratory environment. Thus, connector 80 includes a deflectable and deformable finger 82 (like or similar to any of fingers 23, 37, or 49 described above) which extends out of the plane of the principal portions of the connector between parallel arms 83 between the connections of the arms to the body 84 of the connector. Connector 80 can be made from the blank 85 shown in FIG. 16.

Anchors 31, 46 and 55 and connector 80 are all used in the same manner, i.e., the manner described above as to anchor 10 with reference to FIGS. 13, 14 and 15.

Workers skilled in the art to which this invention pertains will readily appreciate that while the embodiments described above are presently preferred embodiments of the invention, they are but only a few of the various forms which the present anchors may take. The illustrated embodiments have been described by way of example, not as an exhaustive catalog of all of the forms and arrangements possible for the anchor. For example, teeth 54 shown in FIG. 6 as a feature of anchor 31 can also be features of the other anchors described. The foregoing description, therefore, is not to be read as specifically limiting or restricting the scope of this invention to less than the fair scope and meaning of the following claims.

What is claimed is:

1. An assistance device for use with externally threaded fasteners in conjunction with blind holes oversize, as by stripping, relative to the fastener and occurring in a thin article such that the hole is substantially only two dimensional, the device comprising a substantially planar washer-like head having an opening substantially centrally therethrough for passage through the head of the shank of an externally threaded fastener such as a sheet metal screw, and a single laterally deflectable and deformable finger portion connected at one end thereof to the head effectively along a portion of the boundary of the opening and extending away from the head to the other end thereof which is spaced from the head, the other end of the finger being disposed relative to the axis of the opening sufficiently that the finger, upon insertion thereof into a hole in an article to which a connection is to be made and upon insertion of the shank of an externally threaded fastener into the hole through the opening in the head of the device, engages with and interferes with the fastener threads to provide a bite for the threads and is deflected away from the fastener shank and is inelastically permanently deformed by the fastener shank between the shank and the hole to jam and to deform in the hole and around the blind side of the hole sufficiently to secure the device from rotation in the hole and from movement out of the hole.

2. A device according to claim 1 wherein the finger, from adjacent the opening along the length thereof toward its end spaced from the head, is contoured concave away from the axis of the opening.

3. A device according to claim 2 wherein the device is fabricated entirely of metal.

4. A device according to claim 2 wherein the device is fabricated entirely of synthetic plastic material.

5. A device according to claim 1 wherein the finger is connected at said one end thereof to the head along a boundary of the opening and extends from said one end in the plane of the head partially into the opening and thence to its other end.

6. A device according to claim 5 wherein the finger, along substantially the entirety of its length between said other end thereof and the plane of the head, is of substantially V-shaped transverse cross-sectional configuration.

7. A device according to claim 6 wherein said cross-sectional configuration is concave away from the axis of the opening.

8. A device according to claim 7 wherein said V-shaped configuration at the head extends to the boundary of the opening.

9. A device according to claim 1 wherein the finger extends substantially in the plane of the head partially into the opening toward the axis of the opening as well as away from the head to the other end of the finger, and wherein the finger has a length between the plane of the head and its other end which is at least equal to the diameter of the opening.

10. A device according to claim 1 wherein the finger is of pyramidal configuration and has an apex defined by the intersection of three surfaces defined by the finger, the apex and one of said surfaces being disposed in the plane of the opening, said one surface being connected to the boundary of the opening, the other two surfaces of the pyramid intersecting the one surface and extending away from the plane of the head, the other two surfaces intersecting along a line proximate the axis of the opening so that the finger between the plane of the head and its other end has a substantially V-shaped configuration concave away from said axis.

11. A device according to claim 10 wherein the disposition of the finger relative to the axis of the opening, along at least a substantial portion of the length of the finger, is such that when the finger is disposed in a hole into which a screw is to be driven, the finger partially obstructs the hole from free passage of the screw into the hole, whereby the screw must forceably engage and be threaded both into the finger and into a portion of the walls of the hole opposite from the finger in order to be driven into the hole.

12. An anchor for use with screws in conjunction with oversize receiving holes, the anchor comprising a washer-like head having an aperture for passage through the head of the shank of a screw, the head being composed of a first layer of metal in which a round aperture is formed and of a second layer of metal disposed across one face of the first layer and having formed therein a slot aperture dimensioned not to restrict the round aperture, the slot aperture extending to the edge of the second layer, and an elongate finger connected at one end thereof to the head, the other end of the finger being spaced from the head, the finger having the one end thereof connected integrally to the first layer at the edge thereof and extending from its one end in the plane of the second layer within the slot aperture to adjacent the round aperture and then out of the plane of the second layer away from the first layer to its other end, the other end of the finger being disposed closer to the axis of the round aperture than the one end of the finger sufficiently that the finger, upon insertion thereof into a hole in an article to which a connection is to be made and upon insertion of the shank of a screw into the hole through the apertures in the head, interferes with the screw threads to provide a bite for the threads and is deflected away from said axis to jam in the hole.

13. An anchor according to claim 12 wherein the finger has a length from the second head layer to its other end at least equal to the diameter of the round aperture.

14. An electrical connector comprising a metal generally planar body having an opening therethrough for the passage of an externally threaded fastener through the opening and into a hole in a thin member to which a conductor is to be connected, means conductively connected to the body operable from mechanically and conductively connecting an electrical conductor to the body, and a single finger defined integral with the body and connected at one end thereof to the body along a portion of the opening, the finger extending substantially normal to the plane of the body to its other end, the finger being of pyramidal configuration and having an apex defined by the intersection of three surfaces defined by the finger, the apex and one of said surfaces being disposed in the plane of the opening, said one surface being connected to the boundary of the opening, the other two surfaces of the pyramid intersecting the one surface and extending away from the plane of the head, the other two surfaces intersecting along a line proximate the axis of the opening so that the finger between the plane of the head and its other end has a substantially V-shaped configuration concave away from said axis, the finger being so configured and so disposed relative to the opening that upon insertion of the finger into a hole in a member to which a connection is to be made, the finger extends through the thin member and substantially therebeyond and partially obstructs the hole from free passage of a selected externally threaded fastener into a hole, whereby the fastener must forceably engage and be threaded into the finger and the walls of the hole opposite the finger in order to be threaded into the hole and the finger is inelastically deformed in and about the hole.

15. An assistance device for use with externally threaded fasteners in conjunction with holes oversize, as by stripping, relative to the fastener and occurring in a thin article such that the hole is substantially only two dimensional, the device comprising a substantially planar washer-like head having an opening substantially centrally therethrough for passage through the head of the shank of an externally threaded fastener such as a sheet metal screw, and a single laterally deflectable and deformable finger portion connected at one end thereof to the head effectively along a portion of the boundary of the opening and extending away from the head to the other end thereof which is spaced from the head, the other end of the finger being disposed relative to the axis of the opening sufficiently that the finger, upon insertion thereof into a hole in the article and upon insertion of the shank of the fastener into the hole through the opening in the head of the device, engages with and interferes with the fastener threads to provide a bite for the threads and is deflected away from the fastener shank and is inelastically permanently deformed by the fastener shank between the shank and the hole to jam and to deform in the hole and around the article sufficiently to secure the device from rotation in the hole and from movement out of the hole, the finger being of pyramidal configuration and having an apex defined by the intersection of three surfaces defined by the finger, the apex and the one of said surfaces being disposed in the plane of the opening, said one surface being connected to the boundary of the opening, the other two surfaces of the pyramid intersecting the one surface and extending away from the plane of the head, the other two ,28 surfaces intersecting along a line proximate the axis of the opening so that the finger between the plane of the head and its other end has a substantially V-shaped configuration concave away from said axis, whereby a wedging effect between the finger and the fastener causes the finger to bend away from the line proximate the axis of the hole and to wrap around the surface of the article remote from the device head and causes the other two surfaces of the finger along edges thereof opposite the intersection therebetween to jam in the hold to prevent rotation of the device in the hole.

* * * * *